(12) United States Patent
Nam et al.

(10) Patent No.: US 11,704,531 B2
(45) Date of Patent: Jul. 18, 2023

(54) METAL CARD CAPABLE OF BIDIRECTIONAL COMMUNICATION AND METHOD FOR MANUFACTURING METAL CARD

(71) Applicant: KONA M CO., LTD., Chungcheongbuk-do (KR)

(72) Inventors: Ki Sung Nam, Chungcheongbuk-do (KR); Han Sun Kim, Chungcheongbuk-do (KR); Chung Il Cho, Seoul (KR)

(73) Assignee: KONA M CO., LTD., Chungcheongbuk-do (KR)

( * ) Notice: Subject to any disclaimer, the term of this patent is extended or adjusted under 35 U.S.C. 154(b) by 0 days.

(21) Appl. No.: 17/420,003

(22) PCT Filed: Feb. 5, 2020

(86) PCT No.: PCT/KR2020/001641
§ 371 (c)(1),
(2) Date: Jun. 30, 2021

(87) PCT Pub. No.: WO2020/197078
PCT Pub. Date: Oct. 1, 2020

(65) Prior Publication Data
US 2022/0092377 A1 Mar. 24, 2022

(30) Foreign Application Priority Data
Mar. 28, 2019 (KR) .................. 10-2019-0035537

(51) Int. Cl.
*G06K 19/077* (2006.01)
*B23C 3/13* (2006.01)
*B32B 38/10* (2006.01)

(52) U.S. Cl.
CPC .......... *G06K 19/07722* (2013.01); *B23C 3/13* (2013.01); *B32B 38/10* (2013.01); *G06K 19/07775* (2013.01); *B32B 2425/00* (2013.01)

(58) Field of Classification Search
CPC ....... G06K 19/07722; G06K 19/07775; G06K 19/02; G06K 19/0775; G06K 19/07784;
(Continued)

(56) References Cited

U.S. PATENT DOCUMENTS 10,198,686 B2 * 2/2019 Carrier ............ G06K 19/07794
10,699,179 B1 * 6/2020 Yoon ................ G06K 19/07747
(Continued)

FOREIGN PATENT DOCUMENTS

JP  2007-249780 A  9/2007
JP  2009-105774 A  5/2009
(Continued)

*Primary Examiner* — Thien M Le
*Assistant Examiner* — Asifa Habib
(74) *Attorney, Agent, or Firm* — Bridgeway IP Law Group, PLLC; Sang Ho Lee; Hyun Woo Shin

(57) ABSTRACT

A method for manufacturing a metal card includes: a step for forming a metal card by laminating a stack of sheets in which are stacked a plurality of sheets, centered on a metal sheet, including adhesive sheets having the same size as the metal sheet, an upper inlay sheet having a first antenna, and a lower inlay sheet having a second antenna; a step for forming a COB accommodation space, which can accommodate a COB, by milling a certain area of the metal card using computerized numerical control (CNC) machining; a step for forming a through-hole, which exposes the first antenna and the second antenna, by milling a COB contact point region of the COB accommodation space down to the lower inlay sheet; a step for electrically connecting the first antenna and the second antenna by dispensing a conductive elastic liquid into the through-hole; and a step for bidirectionally connecting the first antenna and the second antenna (Continued)

to the COB by attaching the COB within the COB accommodation space so that the COB contact point is connected by the conductive elastic liquid.

11 Claims, 11 Drawing Sheets

(58) Field of Classification Search
CPC .......... G06K 19/0772; G06K 19/07749; B23C 3/13; B23C 3/10; B32B 38/10; B32B 2425/00; C09D 5/24
See application file for complete search history.

(56) References Cited

U.S. PATENT DOCUMENTS

| | | | | |
|---|---|---|---|---|
| 11,121,474 | B2* | 9/2021 | Haven | H01Q 13/106 |
| 2003/0038174 | A1* | 2/2003 | Jones | G06K 19/02 |
| | | | | 361/782 |
| 2004/0217178 | A1* | 11/2004 | Lasch | G06K 19/07728 |
| | | | | 235/488 |
| 2009/0137071 | A1* | 5/2009 | Subramanian | G06K 19/067 |
| | | | | 438/22 |
| 2009/0218401 | A1* | 9/2009 | Moran | G09F 3/10 |
| | | | | 235/487 |
| 2009/0294543 | A1* | 12/2009 | Varga | G06K 19/02 |
| | | | | 235/492 |
| 2012/0325914 | A1* | 12/2012 | Herslow | B32B 37/02 |
| | | | | 428/209 |
| 2014/0176382 | A1* | 6/2014 | Nakano | G06K 7/10178 |
| | | | | 343/788 |
| 2015/0161501 | A1* | 6/2015 | Krull | G06K 19/07754 |
| | | | | 361/764 |
| 2015/0206047 | A1* | 7/2015 | Herslow | H01Q 7/06 |
| | | | | 235/492 |
| 2015/0235122 | A1* | 8/2015 | Finn | H01F 27/363 |
| | | | | 235/492 |
| 2016/0180212 | A1* | 6/2016 | Herslow | G06K 19/02 |
| | | | | 235/492 |
| 2017/0017871 | A1* | 1/2017 | Finn | G06K 19/07794 |
| 2017/0185885 | A1* | 6/2017 | Skelding | G06Q 20/341 |
| 2018/0018551 | A1* | 1/2018 | Carrier | G06K 19/07756 |
| 2018/0121773 | A1* | 5/2018 | Tercsinecz | G06K 19/0702 |
| 2019/0384261 | A1* | 12/2019 | Nam | G06K 19/07722 |
| 2020/0019831 | A1* | 1/2020 | Benkreira | G06K 19/07743 |
| 2020/0127364 | A1* | 4/2020 | Kramer | H04W 4/023 |

FOREIGN PATENT DOCUMENTS

| | | |
|---|---|---|
| KR | 20-0382725 Y1 | 4/2005 |
| KR | 10-2009-0029979 A | 3/2009 |
| KR | 10-2017-0120524 A | 10/2017 |
| KR | 10-2018-0047356 A | 5/2018 |
| KR | 10-1902207 B1 | 11/2018 |

* cited by examiner (A)

(B)

METAL CARD CAPABLE OF BIDIRECTIONAL COMMUNICATION AND METHOD FOR MANUFACTURING METAL CARD

TECHNICAL FIELD

The present invention relates to a metal card and a method of manufacturing the metal card. More specifically, the present invention relates to a metal card capable of bidirectional communication, and a method of manufacturing the same.

BACKGROUND ART

Generally, credit cards may be used instead of cash, and recently, the credit cards are developed as smart cards embedded with IC chips capable of storing a large amount of information, and actively used for payment and also as various membership cards. Special cards using various materials are developed in the market of smart cards. Particularly, credit cards of a metal material differentiated for VIP members are developed, and the metal cards are implemented as high-quality credit cards expressing metallic luster and provided to special customers.

However, in many circumstances, conventional metal cards are limited in using RF functions and ATMs as the antenna is difficult to operate during non-contact communication with a reader due to the characteristics of metal. In addition, since the metal cards are manufactured by using a thin film metal sheet or thinly coating metal powder, it is difficult to form a pattern and characters on the surface of the metal cards, and when the metal cards are formed of an extremely light material, the feeling of weight that a metal has cannot be felt. Accordingly, it is required to develop metal cards that can overcome the limitations of the metal cards and express the weight and beauty unique to metal.

For example, the thin metal film plastic card disclosed in the prior art of Korean Utility Model Registration No. 20-0382725 is a card in which a thin metal film 12 of a size smaller than that of a core sheet 13 made of synthetic resin is attached on the top and bottom surfaces of the core sheet 13 to form a blank space 13a along the edges of the top and bottom surfaces of the core sheet 13, and an antenna coil 21 is installed in the periphery of the blank space 13a. However, this prior art has a limitation in that since metal is disposed in a portion at the center of the card to avoid contact between the antenna and the metal, the overall beauty is lowered, and it is difficult to express metallic texture on the entire card.

Accordingly, a front side metal material card using connection of a metal sheet of an SUS material and an antenna is introduced recently to solve this problem.

However, since the front side metal material card is provided with an antenna coil only on the front side of the metal card, it is inconvenient in that non-contact payment is allowed only unidirectionally and has a disadvantage of low antenna sensitivity.

Accordingly, researches have been made to configure the metal card to be able to communicate bidirectionally. However, until present, since the thickness increases and the antenna connection structure is complicated, it is difficult to design elegantly, and particularly, since increase in the thickness leads to increase in volume and area, there is a problem of lowering usability and productivity.

DISCLOSURE OF INVENTION

Technical Problem

Therefore, the present invention has been made in view of the above problems, and it is an object of the present invention to provide a metal card manufacturing method and a metal card, which can solve the problem of existing metal cards that allow only non-contact payment in one direction, configure the metal card to connect upper and lower antennas to allow bidirectional non-contact payment, and enhance antenna sensitivity while minimizing the thickness.

Technical Solution

To accomplish the above object, according to one aspect of the present invention, there is provided a metal card manufacturing method comprising the steps of: forming a metal card by laminating stacked sheets stacking a plurality of sheets centered on a metal sheet, including adhesive sheets of a size the same as that of the metal sheet, an upper inlay sheet having a first antenna formed thereon, and a lower inlay sheet having a second antenna formed thereon; forming a COB accommodation space capable of accommodating a COB by milling a predetermined area of the metal card through a computerized numerical control (CNC) machining process; forming a through-hole exposing the first antenna and the second antenna by milling a COB contact point area of the COB accommodation space as deep as the lower inlay sheet; electrically connecting the first antenna and the second antenna by dispensing a conductive elastic liquid inside the through-hole; and bidirectionally connecting the first antenna and the second antenna to the COB by attaching the COB in the COB accommodation space so that COB contact points are connected by the conductive elastic liquid.

According to another aspect of the present invention, there is provided a metal card formed by stacking and laminating a plurality of layers including a metal layer of an SUS material heat-treated to improve strength and tension, and adhesive layers of a size the same as that of the metal layer, an upper inlay layer having a first antenna formed thereon, and a lower inlay layer having a second antenna formed thereon, centered on the metal layer, wherein the metal card is manufactured by forming a COB accommodation space capable of accommodating a COB by milling a predetermined area of the metal card through a computerized numerical control (CNC) machining process, forming a through-hole exposing the first antenna and the second antenna through a process of milling a COB contact point area of the COB accommodation space as deep as the lower inlay layer, electrically connecting the first antenna and the second antenna by dispensing a conductive elastic liquid inside the through-hole, and bidirectionally connecting the first antenna and the second antenna to the COB by attaching the COB in the COB accommodation space so that COB contact points are connected by the conductive elastic liquid.

Advantageous Effects

According to an embodiment of the present invention, since connection of COB contact points is implemented in a way of stacking an upper inlay having a first antenna formed thereon and a lower inlay having a second antenna formed thereon centering on a metal sheet, and dispensing a conductive elastic liquid through a through-hole, a bidirectional metal card capable of bidirectional communication can be manufactured while minimizing increase of thickness.

Accordingly, a metal card capable of non-contact bidirectional communication can be manufactured while preserving the special features of a metal material.

In addition, according to an embodiment of the present invention, since a perforation and PVC insertion process is performed not to contact with the metal sheet in dispensing the conductive elastic liquid, it may be processed to naturally connect an antenna coil to the contact points of the COB as the COB is inserted while contact between the antenna coil and the metal sheet is blocked.

Accordingly, productivity of manufacturing the metal card can be enhanced, and magnetic interference that occurs between a layer of a metal material constituting the metal card and an antenna coil for performing non-contact communication can be efficiently controlled. Therefore, according to the manufacturing method of the present invention, a metal card easy to manufacture and capable of improving operational performance while allowing bidirectional communication can be economically and stably manufactured.

BEST MODE FOR CARRYING OUT THE INVENTION

Hereinafter, only the principle of the present invention will be described. Therefore, those skilled in the art may implement the principle of the present invention that is not clearly described or shown in this specification, and invent various apparatuses included within the concept and scope of the present invention. In addition, it should be understood that in principle, all the conditional terms and embodiments arranged in this specification should be clearly intended only for the purpose of understanding the concept of the present invention and are not restrictive to the embodiments and states specially arranged like this.

In addition, throughout the specification, when an element is "connected to" another element, it includes a case of "indirectly connecting" the elements with intervention of another element therebetween, as well as a case of "directly connecting" the elements. In addition, when an element includes a constitutional element, it means further including another constitutional element, not excluding another constitutional element, as far as an opposed description is not specially specified.

In addition, it should be understood that all the detailed descriptions arranging specific embodiments, as well as the principle, viewpoint and embodiments of the present invention, are intended to include structural and functional equivalents thereof. In addition, it should be understood that these equivalents include the equivalents that will be developed in the future, as well as the equivalents open to the public presently, i.e., all components invented to perform the same function regardless of the structure.

The objects, features and advantages described above will be further clear through the following detailed descriptions related to the accompanying drawings, and therefore, those skilled in the art may easily embody the spirit of the present invention. In addition, in describing the present invention, when it is determined that the detailed description of known techniques related to the present invention may unnecessarily blur the gist of the present invention, the detailed description will be omitted.

Figure 1:
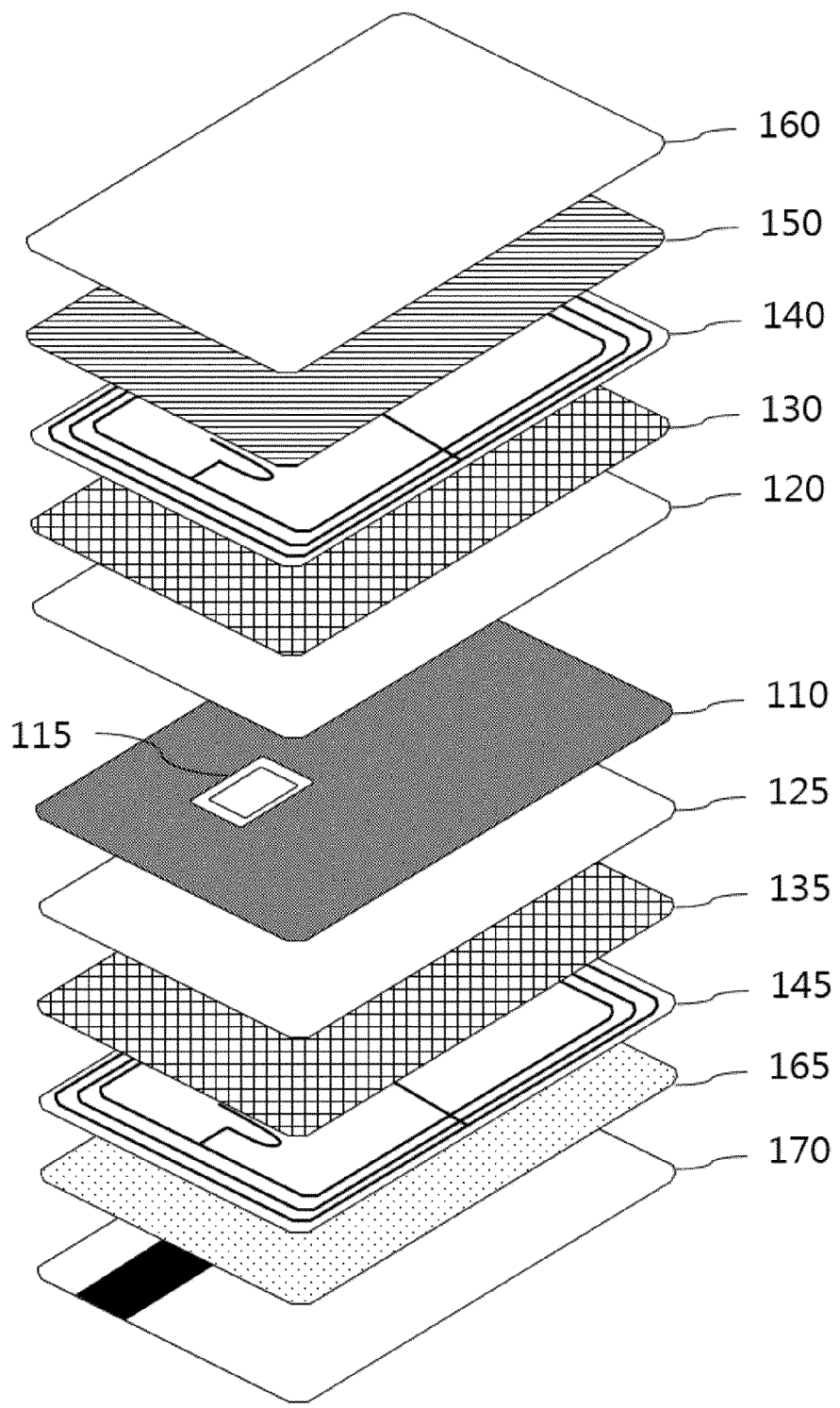
FIG. 1 is a perspective view showing a bidirectional metal card according to an embodiment of the present invention.

FIG. 1 is a perspective view showing a bidirectional communication metal card 100 according to an embodiment of the present invention. The metal card 100 may include one or more sheets or layers.

As an embodiment, the metal card 100 may include a metal layer 110, an insulating layer 130, one or more adhesive layers 120 and 125, a first inlay layer 140 having a first antenna ultrasonically embedded on the metal layer 110, a second inlay layer 145 having a second antenna ultrasonically embedded under the metal layer 110, a hologram layer 150, a first printing layer 160, a second printing layer 165, and a magnetic strip overlay layer (MS O/L) 170. Although only those components described above are shown in this drawing, it is not limited thereto, and other components such as a coating layer, a COB and the like for implementing the metal card may be further added, and a display unit, a biometric sensor unit and the like for additional functions may be additionally included.

In addition, the metal card 100 of the present invention may be manufactured in a standard size and thickness according to predefined criteria, and it may be implemented to determine and combine the size and thickness of each sheet in an optimal thickness suitable for the operation of the metal card and sensitivity of wireless communication.

Furthermore, the sheets constituting the metal card 100 of the present invention may be configured as a large sheet of a size including a plurality of cards, rather than a sheet for making one card, for the sake of mass production.

The metal layer 110 is a core sheet expressing the material and feeling of weight unique to the metal card according to the present invention, and may be formed of a steel use stainless (SUS) material. The metal material constituting the metal layer 110 may be selected considering durability, abrasion, degree of modification and the like for enduring the machining process, as well as the material and weight for expressing the characteristics of metal. As an embodiment, the metal layer 110 made of SUS may be resistant to corrosion and capable of heat treatment. Heat treatment refers to a manipulation process of heating a metal to a certain temperature to improve the metal to have a property or a metal structure of a predetermined purpose according to cooling rate. The metal layer 110 may have prominences and depressions on part or all of the surface to increase adhesive force. In addition, when the metal card 100 is manufactured, the metal layer 110 may be processed through a heat treatment process to improve strength and tension.

As an embodiment, the metal layer 110 of the present invention may be configured as a large sheet including a plurality of cards, and after performing a lamination process of making a single sheet by laminating several sheets and applying heat and pressure, several sheets of cards may be produced through a cutting process. For the operation of cutting the metal sheet including a plurality of cards, a special workpiece, coolant, and cutting tool may be used according to the characteristics of the metal material.

A processing layer 115 is a sheet piece made of plastic (PVC) and may be disposed in a processing layer insertion space of the metal layer 110. The processing layer 115 may be used as a device for connecting the antennas of the first inlay layer 140 and the second inlay layer 145 to the COB while being spaced apart from the metal layer 110 due to the characteristics of the metal card 100.

According to an embodiment of the present invention, the processing layer 115 of a plastic material may be disposed in the form of perforating a portion of the metal layer 110 and inserting the processing layer 115, and as connection of contact points of a conductive elastic liquid insertion method according to an embodiment of the present invention is processed for the processing layer 115, the contact points of the COB may be efficiently connected to the first antenna and the second antenna ultrasonically embedded in the first inlay layer 140 and the second inlay layer 145 while avoiding direct contact between the metal layer 110 and the antennas.

A conventional metal card adopts a method of disposing an antenna on a plastic layer and indirectly communicating with the COB on the metal layer to avoid contact of the antenna with the metal layer 110. Another conventional metal card is implemented to dispose and operate antenna wires by cutting a portion of the metal layer. However, such conventional metal card implementation methods have a limitation in that sensitivity of the antenna is lowered and the beauty of the metal card is lowered.

In addition, although an implementation method of disposing a processing layer only on the front side and connecting antenna wires pulled out from the inside to the contact points of the COB by spot welding has been proposed, such a work is not easy in a dual antenna inlay stack structure for bidirectional communication.

Therefore, in the present invention, connection of contact points is implemented in a method of dispensing a conductive elastic liquid to overcome this problem by disposing a plastic processing layer 115 in the processing layer insertion space of the metal layer 110 so that the first antenna of the upper first inlay layer 140 and the second antenna of the lower second inlay layer 145 may be connected through the through-hole to directly contact the contact points of the COB while being spaced apart from the metal layer through the plastic processing layer 115.

When the upper antenna and the lower antenna are directly connected to the COB as described above, non-contact wireless communication is possible in both directions, and as the entire surface of the card is implemented using a silver metal material, it is possible to complete a metal card that can maintain the luxurious quality of the metal card and improve a bidirectional digital input (DI) wireless communication function while improving sensitivity of the antenna by the wireless connection method between the antennas in the card and the chip (COB).

In addition, since the COB may be mounted to maintain a minimum thickness without the need of separately configuring an extra space for bidirectional wireless communications, there is an effect of further improving the durability and stability of the card.

The insulating layers 130 and 135 perform a function of blocking interference with the metal layer 110 so that the antennas of the inlay layers 140 and 145 may operate. An NFC antenna needs to communicate with an antenna reader on the opposite side to operate, and in this case, a magnetic field is generated in the antenna coils, and as the antennas are attached to both the upper and lower sides of the metal card, the antennas are close to the metal material in many cases. In this case, the metal material of the metal sheet changes the Self Resonant Frequency (SRF) of the antenna coils, and therefore, it worsens the loss, lowers inductance of the antenna coils, and eventually generates a communication failure. This phenomenon is caused by the eddy current generated in the metal due to the magnetic field, and in order to eliminate the eddy current, a material of high permeability and high resistance should be placed between the metal and the antennas to adjust the magnetic lines of force in both directions. The insulating layers 130 and 135 are used for this purpose and also referred to as ferrite sheets. Ferrite is insulated by oxidizing the outer surface after making iron into powder and may be used after making a shape by applying pressure.

The insulating layers 130 and 135 may be adhered to the top and the bottom of the metal layer 110 using the adhesive layers 120 and 125. As an embodiment of the present invention, the adhesive layers 120 and 125 may be hot-melt sheets. Although the adhesive layers 120 and 125 are shown for one card in this figure, they may be implemented as an adhesive sheet of a large area including a plurality of cards in the manufacturing process. Hot melt is being melted by heating, and as a material such as a thermoplastic resin has a characteristic of being solidified when it cools down after being melted by heating, such a material may be used as a film-type hot melt adhesive. As an embodiment, the hot-melt adhesive layers 120 and 125 are adhesive sheets considering the adhesive force between the metal layer 110 of a metal material and the insulating layers 130 and 135, and unlike an adhesive used for plastic sheets, the hot-melt sheets may be implemented using a material suitable for the metal material.

In addition, as an embodiment, at least one of the insulating layers 130 and 135 of the metal card 100 may be used in a form being fragmented into one or more pieces. For example, the insulating layer may be implemented to be formed of non-uniform pieces by crushing the insulating layer 130, or may be made of several uniform pieces. When at least one of the insulating layers 130 and 135 is used after being crushed into pieces in this way, as the hot melt material is melted down and flows into the gaps between the pieces when the insulating layer is attached to the hot melt, there is an advantage in that the adhesive force to the adhesive sheet is improved.

In addition, as an embodiment, at least one of the insulating layers 130 and 135 of the metal card 100 may further include ferrite of a powder form. The ferrite is an insulator having strong magnetism, and when it is implemented in the form of powder, the adhesive force increases, and the insulating function between the metal layer 110 and other sheets may be further improved as an additional insulating layer is formed by stacking. Although an embodiment of implementing the ferrite in the form of powder has been described as an example, it is not limited thereto, and the ferrite may be manufactured in the form of a net or amorphous powder. As the ferrite is an insulating material having strong magnetism, the insulating characteristic is enhanced in both directions of the top and bottom of the metal sheet as the ferrite is added, and normal bidirectional antenna operation in the metal card may be guaranteed.

The first inlay layer 140 and the second inlay layer 145 are sheets including a radio frequency (RF) antenna coil, and the number of turns of the first antenna coil included in the first inlay layer 140 and the second antenna coil included in the second inlay layer 145 is determined to exhibit an optimized sensitivity through an RF communication (e.g., NFC) sensitivity test. In addition, the antenna coils of the present invention may be implemented to be directly connected to the chip-on-board (COB) attached to the metal layer 110 through the processing layer 115.

The first printing layer 160 and the second printing layer 165 are sheets for printing and displaying information on the card, or printing and displaying images such as the information, pattern, and emblem of the card, and may be attached on the front and rear sides of the card.

In addition, the hologram layer 150 may be prepared by hot stamping a hologram foil by means of transfer, laminating a plurality of moldings having a hologram pattern formed thereon, or depositing a molding having a hologram pattern formed thereon, or may include a coating layer on which a hologram pattern is finely processed by UV resin coating, so that the hologram pattern formed on the metal card may be printed.

In addition, the hologram layer 150 may be a non-conductive hologram sheet, and in this case, according to the NCVM (Non-Conductive Vacuum Metallizing) method, it may be processed to provide metallic luster on the surface and coat an electrical non-conductive film thereon.

More specifically, although the non-conductive film coated on the hologram layer 150 in the NCVM method may exhibit metallic texture between atoms as the metal atoms are arranged on the surface at regular intervals, it may have a property of not having electrical conductivity.

As the NCVM process like this may process the coating target not to attenuate radio waves while having a metallic appearance, it is applied to cellular phone cases, cellular phone exterior materials, automobile parts, electronic products, home appliances, and the like, and as the NCVM process is also applied to the hologram layer 150 according to an embodiment of the present invention, metallic texture of the metal card 100 may be further maximized.

Various methods for coating the hologram layer 150 with an electrically non-conductive film may be used as the NCVM method, and for example, a deposition method such as an evaporation method, a sputtering method or the like may be an example. In addition, the material of the hologram layer 150 used in the method may include at least one among indium (In), tin (Sn), and silicon (Si), and from the aspect of cost and environment, it is preferable that tin (Sn) is mainly used.

Meanwhile, the magnetic strip overlay layer 170 may be a sheet including a magnetic strip.

After inserting the processing layer 115 through primary processing of the metal layer 110 (e.g., CNC machining for forming a processing layer insertion space), the components described above may be laminated to stack all the sheets 160, 150, 140, 130, 120, 110, 125, 135, 145, 150, 160, 165, and 170 and processed to form one card body through lamination.

Figure 2:
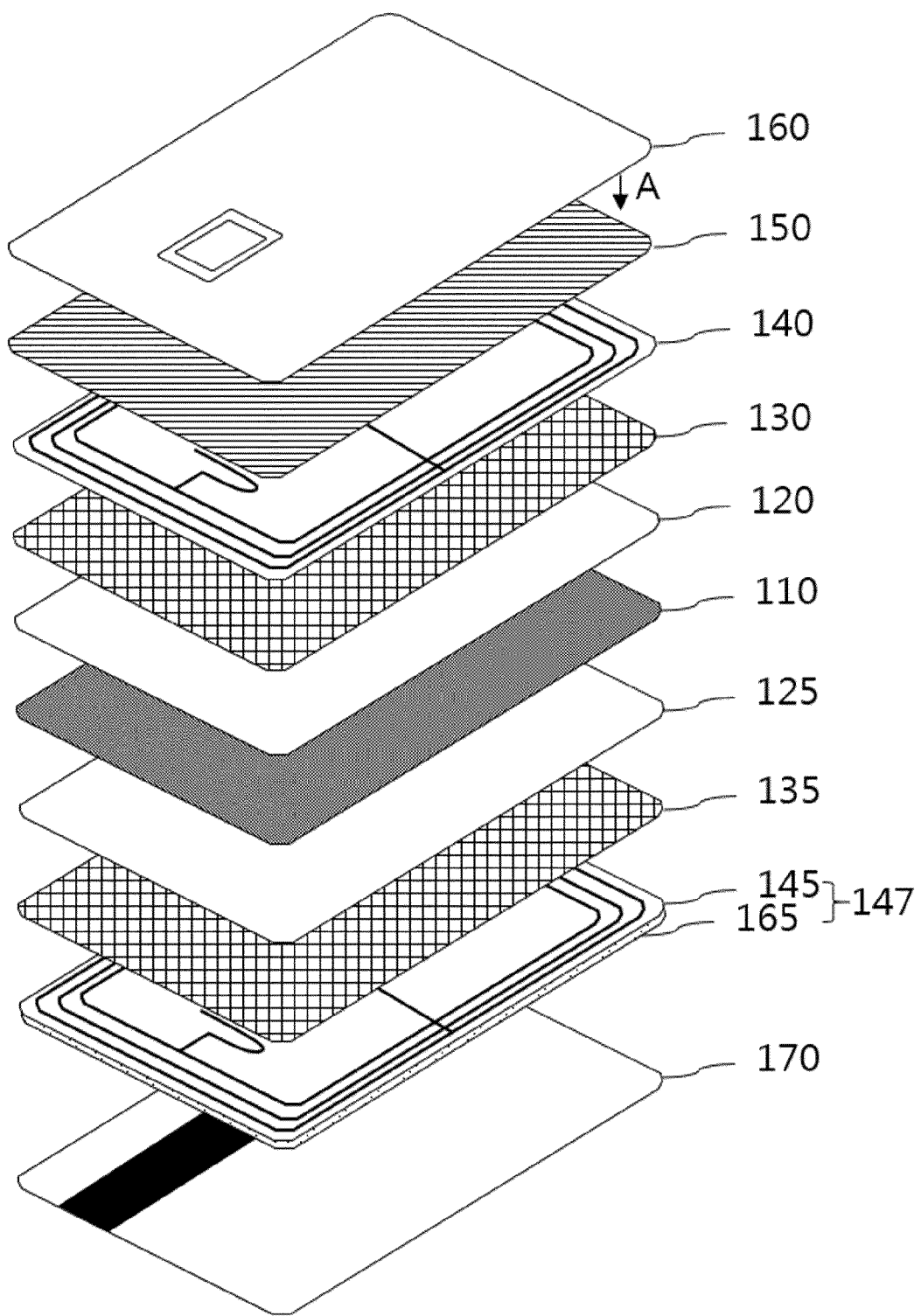
FIG. 2 is a perspective view showing a bidirectional metal card according to another embodiment of the present invention.

FIG. 2 is a perspective view showing a metal card according to another embodiment of the present invention. The metal card 100 according to this embodiment may include one or more sheets or layers. In addition, as shown in FIG. 1, the metal card 100 may include a metal layer 110, an insulating layer 130, one or more adhesive layers 120 and 125, a first inlay layer 140 having a first antenna ultrasonically embedded on the metal layer 110, a second inlay layer 145 having a second antenna ultrasonically embedded under the metal layer 110, a hologram layer 150, a first printing layer 160, a second printing layer 165, and a magnetic strip overlay layer (MS O/L) 170. The metal card 100 is not limited thereto, and components such as a display unit, a biometric sensor or the like for implementing the metal card may be further included.

Here, the first printing layer 160 of the metal card 100 according to an embodiment of the present invention may be processed in the direction toward the rear surface (direction A), not toward the top surface, as the printing direction. In this case, thickness of the first printing layer 160 may be further reduced since the printing surface is compressed. For example, a thickness of 0.14 mm is occupied in the case of top printing, whereas when the printing is performed in the rear direction according to an embodiment of the present invention, the printing layer may be compressed to a thickness of 0.10 mm.

In addition, in the case of the second inlay layer 145 on the lower side, it may be formed as an inlay-integrated printing layer 147 integrated with the second printing layer 165. To this end, the inlay-integrated printing layer 147 may be formed as a double-sided layer of a method of ultrasonically embedding the second antenna on the top surface and then printing print information of the second printing layer 165 on the bottom surface, and accordingly, the problem of increasing the thickness that occurs when a metal card capable of double-sided (bidirectional) communication is implemented can be minimized by reducing the thickness of 0.23 mm of the two-layer stack to 0.15 mm.

Figure 3:
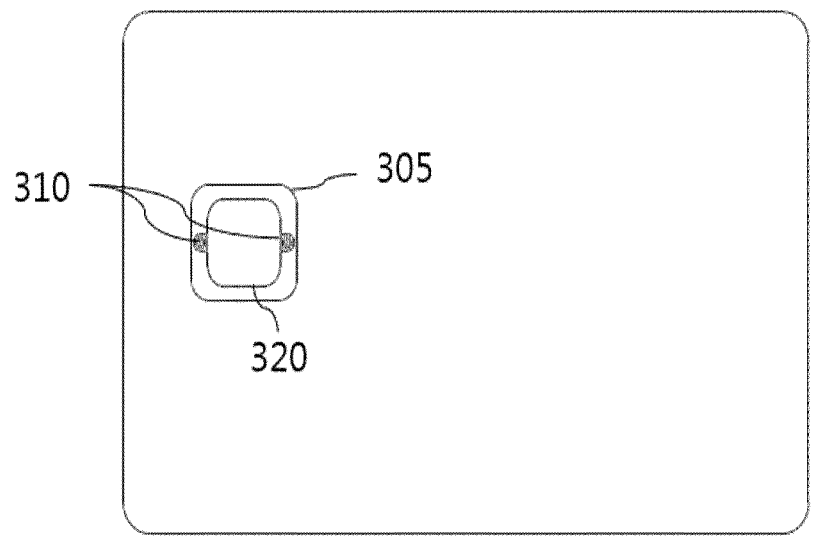
FIG. 3 is a view showing a Chip-On-Board (COB) inserted in a bidirectional metal card and connection between contact points thereof and an antenna according to an embodiment of the present invention.
Figure 3:
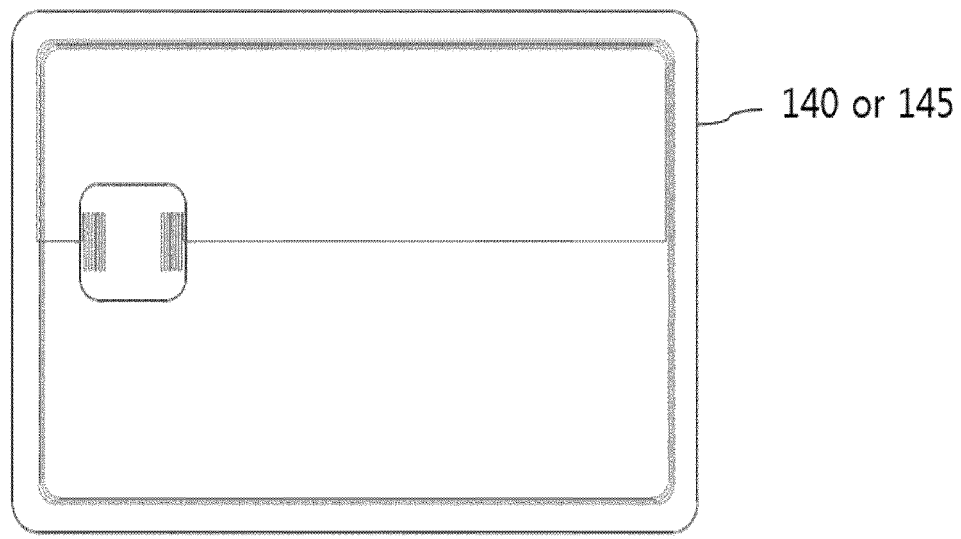

FIG. 3 is a view showing a Chip-On-Board (COB) inserted in a bidirectional metal card and connection between contact points thereof and an antenna according to an embodiment of the present invention.

As shown in FIG. 3(A), the COB 300 may include a COB chip 320 provided on the COB pad 305 and COB contact points 310, and as shown in FIG. 3(B), the first inlay layer 140 and the second inlay layer 145 may include a first antenna and a second antenna formed by coiling or etching so that one ends of which are connected to the contact points 310 by conductive elastic liquid.

Figure 4:
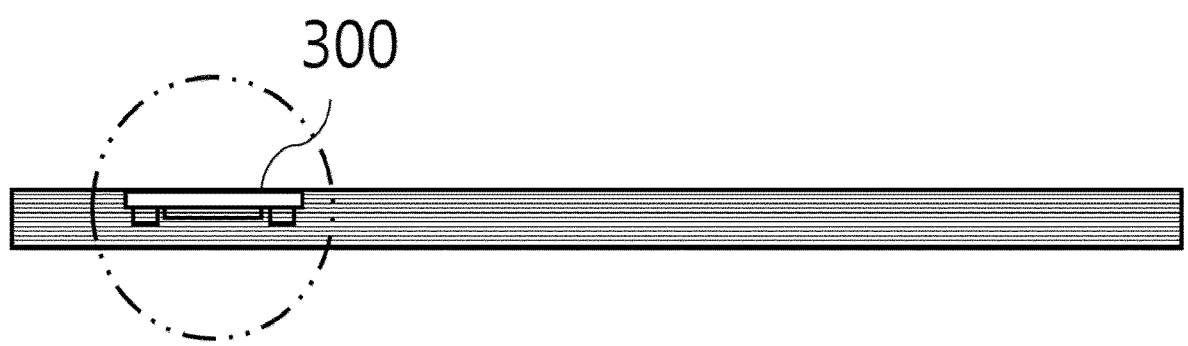
FIG. 4 is a cross-sectional view showing a metal card manufactured according to an embodiment of the present invention.
Figure 5:
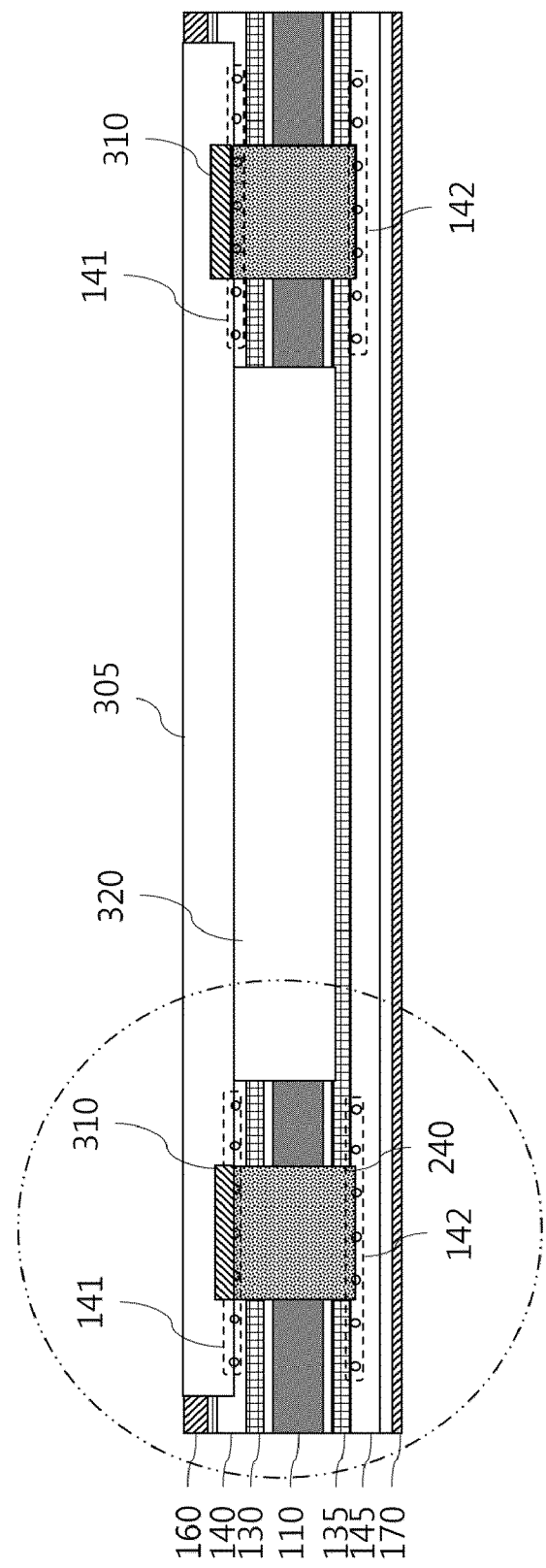
FIG. 5 is an enlarged view showing the portion indicated by a dotted line in FIG. 4.

In addition, FIG. 4 is a cross-sectional view showing a metal card manufactured according to an embodiment of the present invention, and FIG. 5 is an enlarged view showing the portion indicated by a dotted line in FIG. 4.

Referring to FIGS. 4 and 5, as a conductive layer 240 formed to electrically connect a first antenna 141 of the first inlay layer 140 and a second antenna 142 of the second inlay layer 145 in the vertical direction is formed to pass through in the metal card 100 primarily stacked and laminated, the metal card 100 according to an embodiment of the present invention may be configured to electrically connect the COB contact points 310 to the first antenna 141 and the second antenna 142.

To this end, the CNC machining and the process of dispensing a conductive elastic liquid for connecting and fixing the COB contact points 310 to the conductive layer 240 may be performed on the metal card 100 according to an embodiment of the present invention as the COB pad 305 and the COB chip 320 are accommodated therein, and this will be described in more detail with reference to FIGS. 6 to 12.

Figure 6:
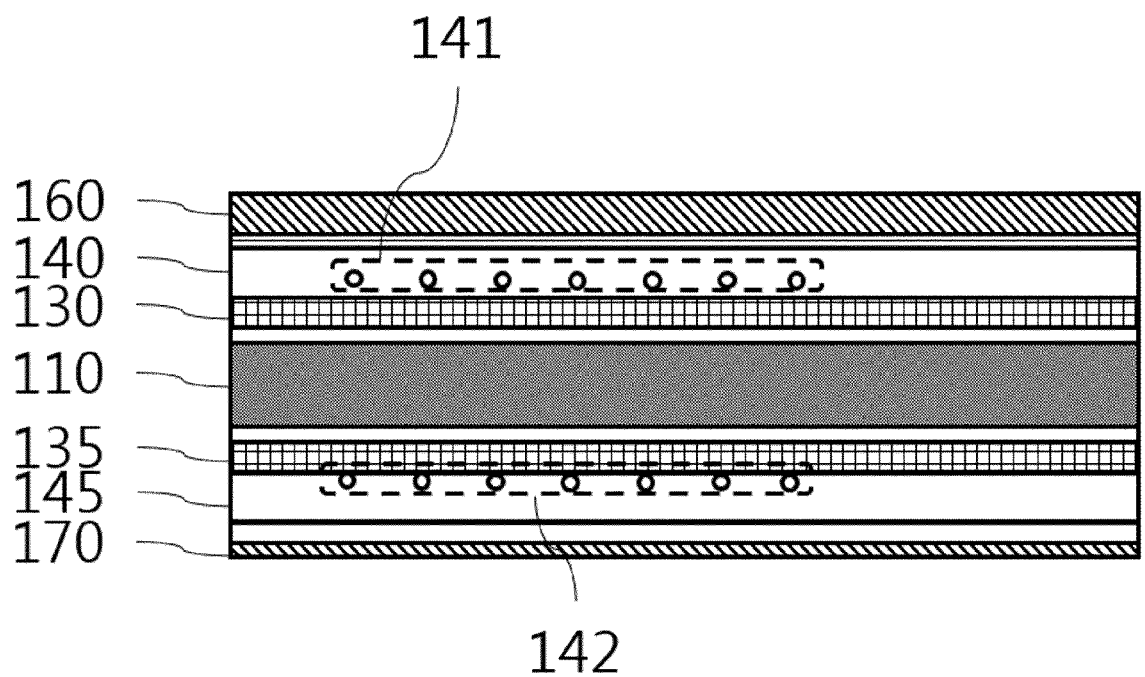
FIGS. 6 to 12 are cross-sectional views for explaining a method of manufacturing a metal card according to an embodiment of the present invention.

First, FIG. 6 is a partial cross-sectional view showing the portion of the dotted line in FIG. 5 of the metal card 100 body that is primarily processed to form one card body through lamination after all the sheets 160, 150, 140, 130, 120, 110, 125, 135, 145, 150, 160, 165, and 170 are laminated to be stacked.

The card body may be implemented as a single plate through a laminating process by heat and pressure, and may appear as shown in FIG. 6. In this state, through sequential CNC machining, secondary processing of forming a COB pad accommodation unit, a COB chip accommodation unit, and a through-hole for connecting the COB contact points may be performed on the metal sheet.

Figure 7:
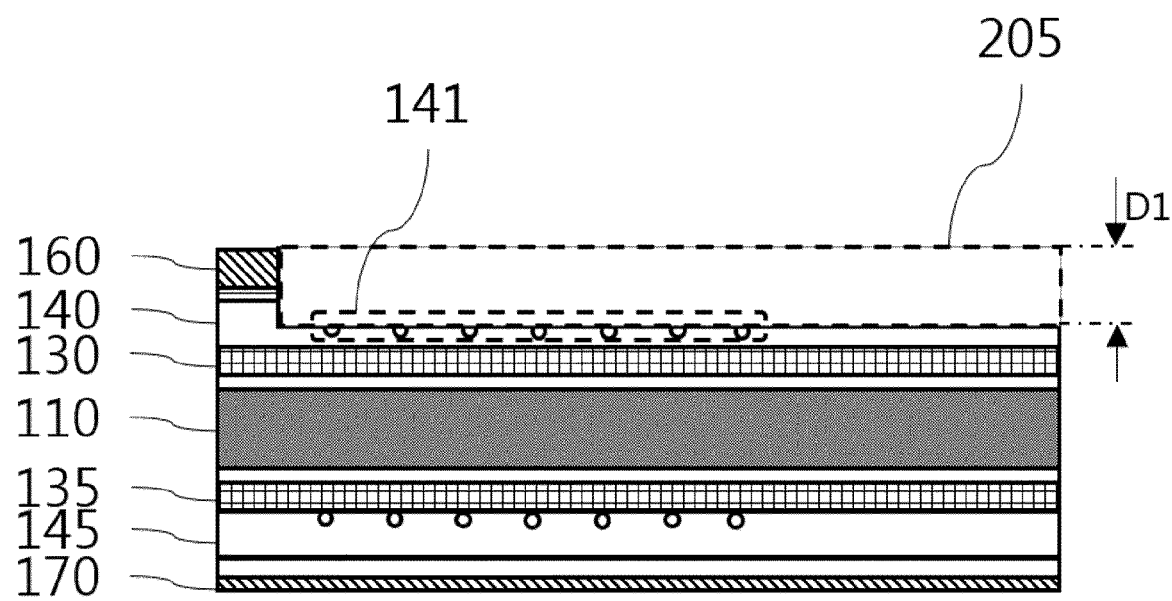

First, referring to FIG. 7, the laminated sheets may be cut as much as depth D1 until the upper first inlay layer 140 is exposed in correspondence to the COB pad accommodation unit 205 corresponding to the COB pad 305 area. By this primary milling process, the concave COB pad accommodation unit 205 having a width corresponding to the width of the COB pad and a depth of D1 may be formed.

For example, while 0.10 mm of the upper first printing layer 160, 0.06 mm of the hologram layer 150, 0.12 mm of the first inlay layer 140, 0.06 mm of the upper insulating layer 130, 0.20 mm of the metal layer 110, 0.06 mm of the lower insulating layer 135, 0.15 mm of the second inlay layer 165, and 0.04 mm of the magnetic strip overlay layer 170 are sequentially stacked, the depth of D1 may be preferably set to 0.22 mm.

Figure 8:
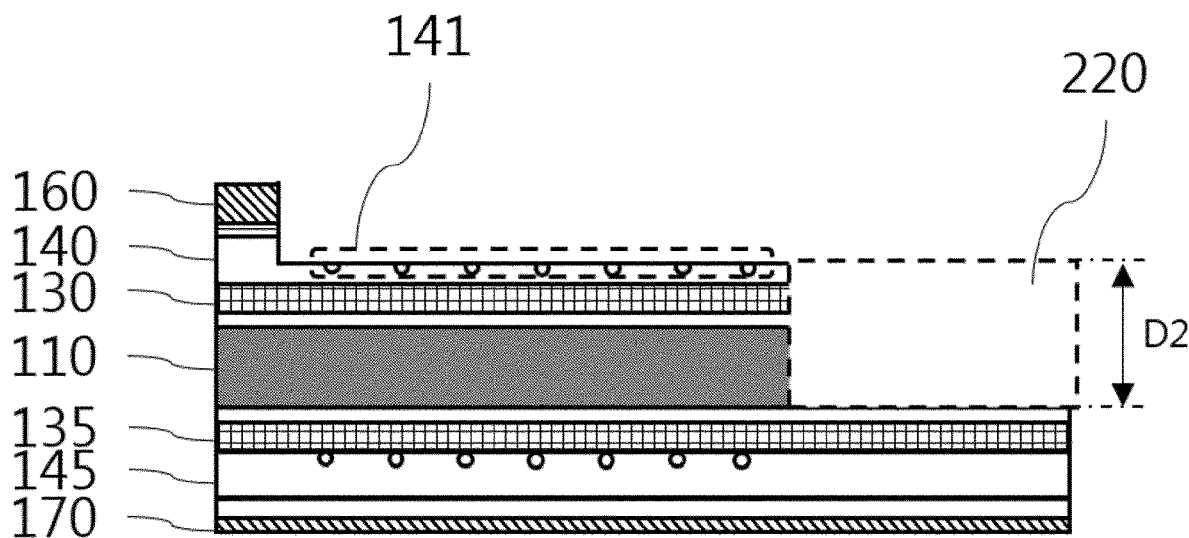

Thereafter, referring to FIG. 8, the laminated sheets may be cut as much as depth D2 corresponding to the depth of the metal layer 110 in correspondence to the COB chip accommodation unit 220 corresponding to the COB chip 320 protruding on the rear side of the COB. This is to secure a space for accommodating the COB chip 320 area protruding on the rear side of the COB and flatten the front side of the card, and at least part of the first inlay layer 140, the first insulating layer 130, and the metal layer 110 may be milled as much as a predetermined width so that the protrusion on the rear side of the COB may be inserted. The milling width of the COB chip accommodation unit 220 may be smaller than that of the COB pad 305 area, and secondary milling may be performed on the inner area rather than the first antenna 141 area.

Accordingly, a concave chip accommodation unit 220 having a width corresponding to the width of the protrusion of the COB chip and a depth of D2 may be formed.

For example, while 0.10 mm of the upper first printing layer 160, 0.06 mm of the hologram layer 150, 0.12 mm of the first inlay layer 140, 0.06 mm of the upper insulating layer 130, 0.20 mm of the metal layer 110, 0.06 mm of the lower insulating layer 135, 0.15 mm of the second inlay layer 165, and 0.04 mm of the magnetic strip overlay layer 170 are sequentially stacked and depth D1 is 0.22 mm, depth D2 may be preferably set to 0.31 mm.

Figure 9:
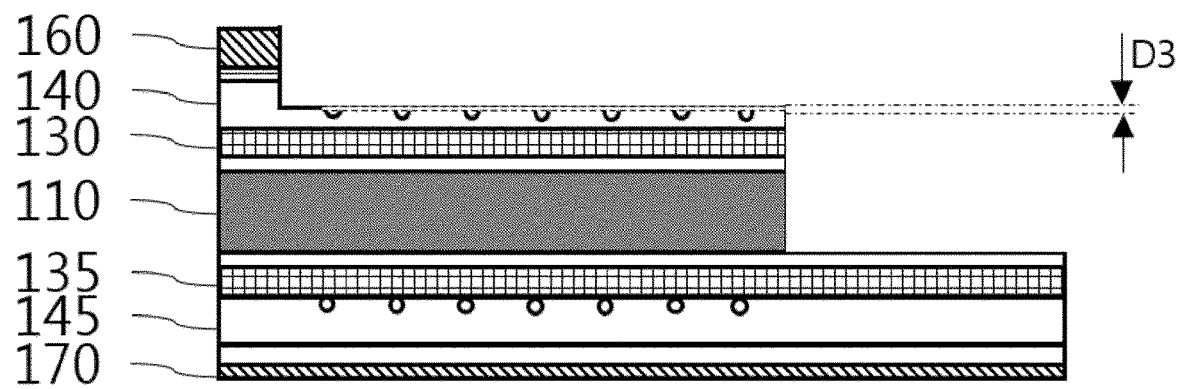

Meanwhile, referring to FIG. 9, cutting may be further performed as much as depth D3 by adjusted additional tertiary milling until part of the first antenna 141 is exposed. The exposed first antenna 141 may be electrically connected to the COB contact points 310, which will be inserted thereafter, by conductive elastic liquid, and accordingly, it is preferable to be exposed at a position adjacent to the contact points 310.

Accordingly, a flat contact point attaching area having a width corresponding to the width of an area contacting the COB contact points 310 and a depth of depth D3 corresponding to attachment of the contact points may be formed.

For example, while 0.10 mm of the upper first printing layer 160, 0.06 mm of the hologram layer 150, 0.12 mm of the first inlay layer 140, 0.06 mm of the upper insulating layer 130, 0.20 mm of the metal layer 110, 0.06 mm of the lower insulating layer 135, 0.15 mm of the second inlay layer 165, and 0.04 mm of the magnetic strip overlay layer 170 are sequentially stacked, and depth D1 is 0.22 mm and depth D2 is 0.31 mm, depth D3 may be preferably set to 0.02 mm.

Figure 10:
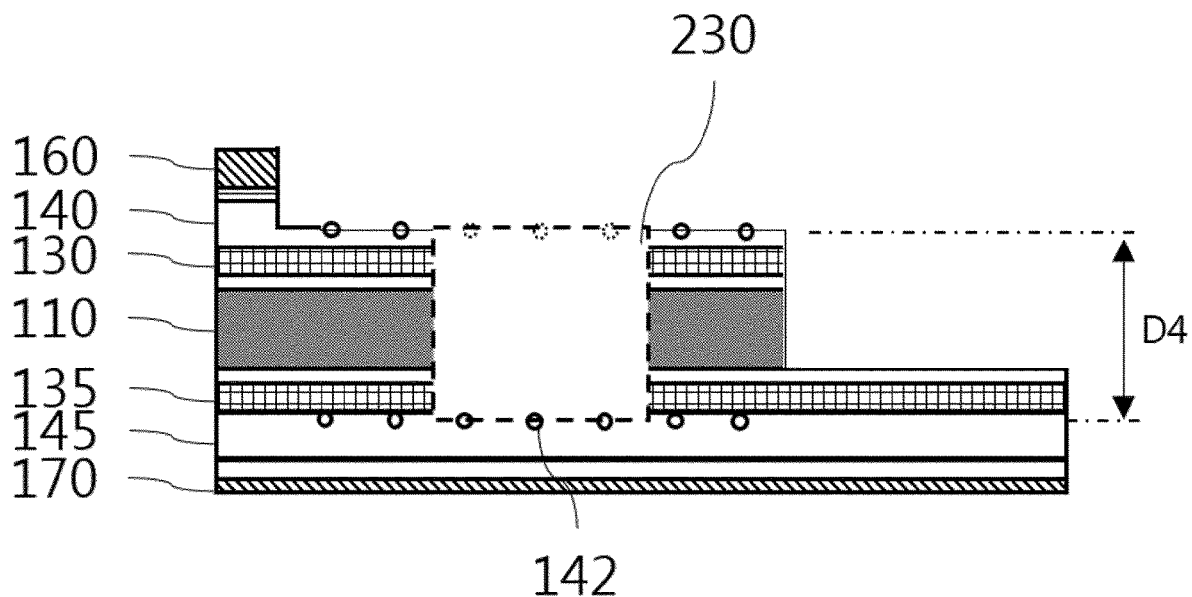

Thereafter, referring to FIG. 10, quaternary milling of processing a through-hole 230 having a depth of D4 may be performed at a predetermined position corresponding to the COB contact point area until the second antenna 142 is exposed. Accordingly, the first antenna 141 of the first inlay layer 140 and the second antenna 142 of the second inlay layer 145 may be in an exposed state together through the through-hole 230.

Accordingly, the through-hole 230 having a width corresponding to the width of the contact point attaching area and a depth corresponding to the depth of exposing the second antenna 142 of the second inlay layer 145 may be formed.

For example, while 0.10 mm of the upper first printing layer 160, 0.06 mm of the hologram layer 150, 0.12 mm of the first inlay layer 140, 0.06 mm of the upper insulating layer 130, 0.20 mm of the metal layer 110, 0.06 mm of the lower insulating layer 135, 0.15 mm of the second inlay layer 165, and 0.04 mm of the magnetic strip overlay layer 170 are sequentially stacked, and depth D1 is 0.22 mm, depth D2 is 0.31 mm, and depth D3 is 0.02 mm, depth D4 may be preferably set to 0.04 mm.

Figure 11:
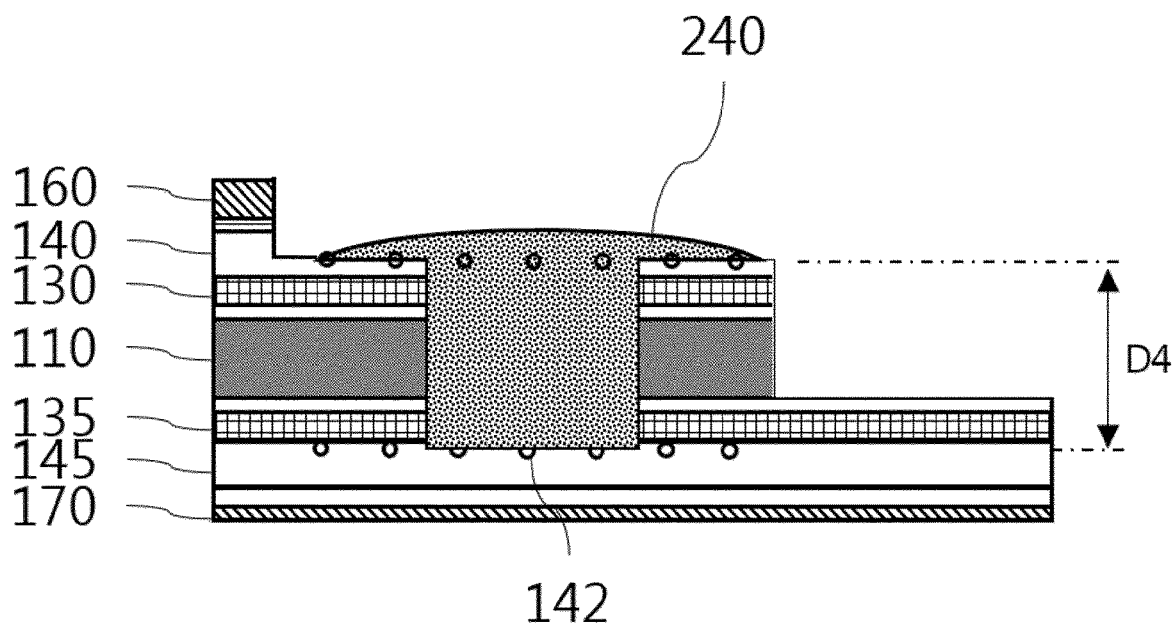

When the processing like this is completed, as shown in FIG. 11, a conductive elastic liquid for adhesive fixing and electrical conduction when the contact points 310 of the COB are inserted may be dispensed inside and on the top of the through-hole 230. The conductive elastic liquid may be dispensed until a dome shape of a predetermined height is maintained on the through-hole 230 for easy connection with the COB contact points 310.

Here, the conductive elastic liquid may be a conductive curing agent mixed with metal powder or an elastomer for a flexible electronic material, e.g., a plasticizer including at least one among silicone, urethane, fluoro elastomer, styrene butadiene, neoprene, acrylonitrile copolymer, and acrylate rubber, which contain conductive filler.

The conductive elastic liquid may have a property of curing at a predetermined temperature or over time like conductive silicone rubber, and may be applied through the through-hole 230 to electrically connect the first antenna 141 and the second antenna 142, fix the COB 300 mounted thereafter, and form an electrical connection passage of the COB.

Figure 12:
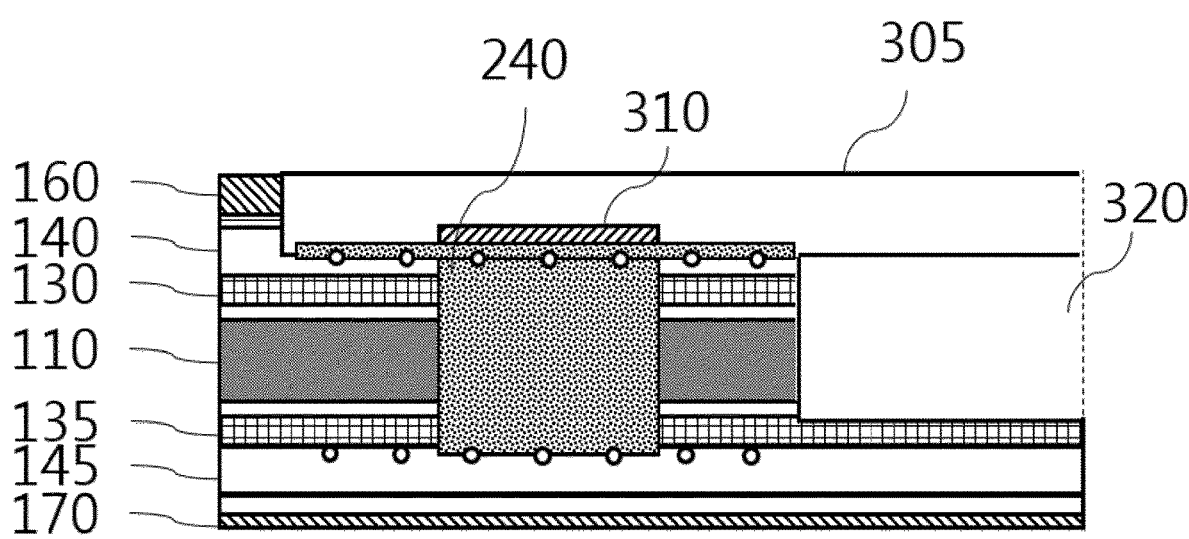

Accordingly, as shown in FIG. 12, a process of mounting the COB 300 may be performed, and as the dome portion of the conductive elastic liquid spreads between the antenna 141 and the contact points 310 and is appropriately applied while the pad 305 of the COB and the protrusion of the chip 320 are properly mounted, the electrical connection between the contact points 310 and the first antenna 141 may be consolidated.

Thereafter, connection of the second antenna 142 at the bottom and the first antenna 141 to the COB contact points 310 may be fixed even without an adhesive by the conductive layer 240 that is formed as the conductive elastic liquid is cured. In this case, it may be processed to fix the COB 300 by applying an adhesive to the rear side of the COB 300 and the milled area.

After attaching the COB, tuning of the resonance frequency corresponding to the bidirectional antenna may be additionally performed. Preferably, the resonance frequency may be set to 14.5 to 16 MHz.

In this way, as the connection of the COB contact points 310 of the bidirectional antennas is easily processed while the thickness is minimized, it is possible to manufacture a metal card 100 which is very elegant and capable of bidirectional communication.

Furthermore, according to an embodiment of the present invention, since the first antenna 141 and the second antenna 142 are commonly connected to each other to enable bidirectional communication according to the same communication protocol, and various functions such as increasing the amount of power that the card reader receives or improving RF stability by using a dual antenna as each of the antennas, there is an effect of improving convenience of users.

In addition, as an embodiment, the COB inserting process may be performed after the printing and coating process on the front side of the card is completed. Although a case of a square-shaped COB 300 is shown in this figure, it is not limited thereto, and each accommodation unit and through-hole may be manufactured through a milling process to correspond to the shape of the protrusion on the rear side of the COB and to minimize the marginal space other than the space required for connection of the antennas.

Although each sheet is shown to be thicker than the actual layers in this drawing in order to described the sheets, the actual sheets may be formed to be very thin. In addition, although an embodiment of generating a COB insertion area through a milling process has been described in the present invention, it is not limited thereto, and a method of applying an acid-resistant anticorrosive agent to the portions other than the position where the COB 300 is to be attached, making a hole of the size of the COB pad by corroding the metal layer 110 in an etching method after immersing the metal layer 110 in a diluted acid, and attaching the COB 300 in the hole may be used. Specifically, the acid-resistant anticorrosive agent may be coated on the metal layer 110 made of an SUS material, and the acid-resistant anticorrosive agent may be applied to the portions other than the position where the COB pad is to be inserted. Here, the acid-resistant anticorrosive agent may use "etching ground" in which beeswax, bitumen, and rosin are mixed. It may be perforated to form an insertion space of a COB size by immersing the metal layer 110 coated with the acid-resistant anticorrosive agent in a tank containing diluted acid, and corroding the metal layer in an etching method. At this point, as fine prominences and depressions are generated in the process of corroding the created space, a very strong attachment can be made when the COB pad is attached to the space. This etching method may also be applied when a COB pad insertion space or the through-hole is formed.

Figure 13:
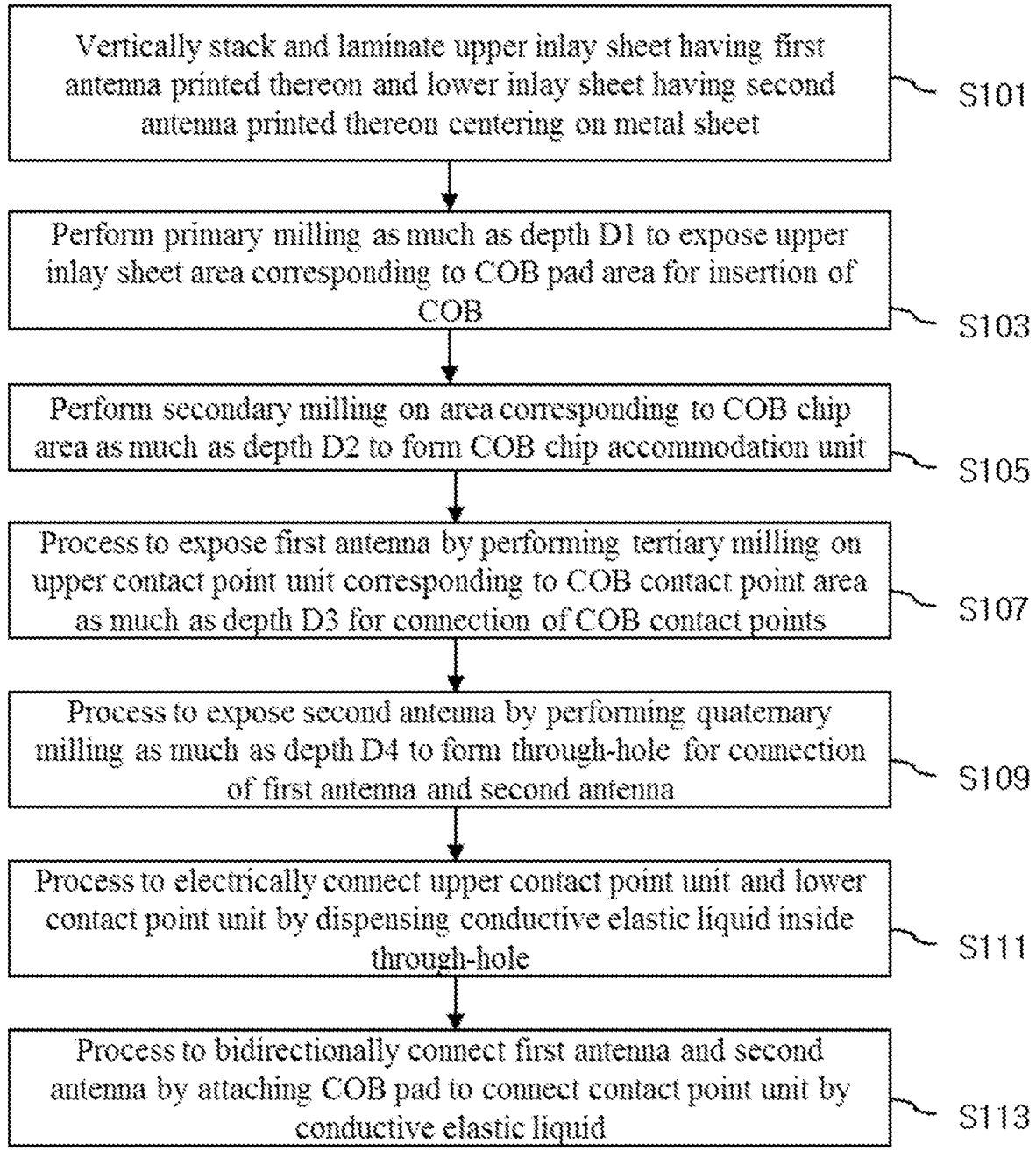
FIG. 13 is a flowchart illustrating a method of manufacturing a metal card according to an embodiment of the present invention.

FIG. 13 is a flowchart illustrating a method of manufacturing a metal card according to an embodiment of the present invention.

FIG. 13 is a flowchart illustrating a method of manufacturing a metal card according to an embodiment of the present invention. In the embodiment described with reference to the drawing, a process of bidirectionally connecting an antenna based on dispensing a conductive elastic liquid is mainly described in the method of manufacturing a metal card. As described above, although the stack structure of individual cards has been mainly described in this embodiment, a metal sheet, an adhesive sheet, an insulating sheet, an inlay sheet, and the like may be implemented and laminated in the form of a large-area sheet in the manufacturing process.

First, a metal layer 110 based on the metal sheet is formed, and an upper inlay sheet formed by ultrasonically embedding the first antenna and a lower inlay sheet formed by ultrasonically embedding of the second antenna are stacked and laminated on the top and bottom of the metal layer 110 (S101).

The metal layer 110 undergoes a heat treatment process according to the characteristics of steel use stainless (SUS). When the metal layer 110 is heat-treated, it is effective for card processing since tension is improved and strength is increased. When SUS is used for the metal layer 110, the adhesive property is excellent since there are some prominences and depressions on the surface of the raw material itself. On the contrary, when a material such as aluminum is used, a method of forming an oxide treatment layer by grinding an aluminum plate with aluminum oxide or coarsely processing the aluminum plate in a sand blast method may be used to improve adhesive force.

As an embodiment, a process of applying a color to the metal layer 110 may be performed. For example, when the raw material color (e.g. silver color) of the metal layer 110 is used as it is, the process of applying a color may be omitted. However, when a color is applied to the metal layer 110, a deposition technique that makes particles adhere using a magnetic field may be used. That is, a color may be applied on the metal sheet by processing particles expressing the color to form a deposition layer of a thin film type on the surface of the metal sheet.

In addition, the metal layer 110 is laminated with other sheets, and a lamination process may be performed by applying heat and pressure. After the lamination process, all of the metal layer 110, the insulating layer 130, one or more adhesive layers 120 and 125, the first inlay layer 140, the second inlay layer 145, the hologram layer 150, the first printing layer 160, the second printing layer 165, and the magnetic stripe overlay layer (MS O/L) 170 may be combined together to be implemented in the form of a single card body.

The lamination process according to the present invention may be performed at a low temperature and low pressure compared with those of plastic, and the processing time may be shorter than that of a card made of a plastic material. As an embodiment, the lamination processing time and heat treatment conditions such as temperature, pressure and the like may be determined in consideration of the adhesive force, thickness of the metal sheet, and the degree of deformation of the processing layer. For example, when the metal sheet is thick, the lamination temperature may be further increased. In addition, when there is a processing layer made of PVC, it is highly probable that the PVC layer is contracted or relaxed compared to the metal sheet, and the lamination time and temperature may be determined considering the degree of deformation (contraction or relaxation) of the PVC when the lamination process is performed.

Thereafter, the laminated sheets may be cut through a primary milling process as much as depth D1 to expose the COB pad accommodation unit 205 of the upper inlay sheet corresponding to the COB pad 305 area (S103).

Thereafter, through a secondary milling process, the laminated sheets may be milled as much as depth D2 corresponding to the depth of the metal layer 110 in correspondence to the COB chip accommodation unit 220 corresponding to the COB chip 320 protruding on the rear side of the COB (S105).

This is to secure a space for accommodating the COB chip 320 area protruding on the rear side of the COB and flatten the front side of the card, and at least part of the first inlay layer 140, the first insulating layer 130, and the metal layer 110 may be milled as much as a predetermined width so that the protrusion on the rear side of the COB may be inserted.

The milling width of the COB chip accommodation unit 220 may be smaller than that of the COB pad 305 area, and secondary milling may be performed on the inner area rather than the first antenna 141 area.

In addition, through a tertiary milling process, cutting may be further performed as much as depth D3 by adjusted additional tertiary milling until part of the first antenna 141 is exposed (S107).

The exposed first antenna 141 may be electrically connected to the COB contact points 310, which will be inserted thereafter, by conductive elastic liquid, and accordingly, it is preferable to be exposed at a position adjacent to the contact points 310.

Thereafter, quaternary milling of processing a through-hole 230 having a depth of D4 may be performed at a predetermined position corresponding to the COB contact point 310 area until the second antenna 142 is exposed (S109).

Accordingly, the first antenna 141 of the first inlay layer 140 and the second antenna 142 of the second inlay layer 145 may be in a state exposed to the outside together through the through-hole.

When the processing like this is completed, conductive elastic liquid for adhesive fixing and electrical conduction when the contact points 310 of the COB are inserted may be dispensed inside and on the top of the through-hole 230 (S111).

The conductive elastic liquid may be dispensed until a dome shape of a predetermined height is maintained on the through-hole 230 for easy connection with the COB contact points 310.

Here, the conductive elastic liquid may be a conductive curing agent mixed with metal powder or an elastomer for a flexible electronic material, e.g., a plasticizer including at least one among silicone, urethane, fluoro elastomer, styrene butadiene, neoprene, acrylonitrile copolymer, and acrylate rubber, which contain conductive filler.

The conductive elastic liquid may have a property of curing at a predetermined temperature or over time like conductive silicone rubber, and may be applied through the through-hole 230 to electrically connect the first antenna 141 and the second antenna 142, fix the COB 300 mounted thereafter, and form an electrical connection passage of the COB.

Here, the COB may be assembled as a package for information transfer and short-range wireless communication as a semiconductor for a smart card is attached.

Accordingly, a process of mounting the COB 300 may be performed (S113), and as the dome portion of the conductive elastic liquid spreads between the antenna 141 and the contact points 310 and is appropriately applied while the pad 305 of the COB and the protrusion of the chip 320 are properly mounted, the electrical connection between the contact points 310 and the first antenna 141 may be consolidated.

Thereafter, connection of the second antenna 142 at the bottom and the first antenna 141 to the COB contact points 310 may be fixed even without an adhesive by the conductive layer 240 that is formed as the conductive elastic liquid is cured. In this case, it may be processed to fix the COB 300 by applying an adhesive to the rear side of the COB 300 and the milled area.

On the other hand, although not shown in the metal card 100 according to an embodiment of the present invention, a primer, 3D printing, and coating process may be added to the body, and a C-Cut process of trimming the corners of the card and a stamping process of attaching a sign panel, a hologram or the like on the rear side of the card may be additionally performed.

Furthermore, the sheets constituting the metal card 100 of the present invention may be configured as a large sheet of a size including a plurality of cards, rather than a sheet for making one card, for the sake of mass production, and after the lamination process, several sheets of cards may be produced through a cutting process. For the operation of cutting the metal layer 110, a special workpiece, coolant, and cutting tool may be used according to the characteristics of the metal material.

Figure 14:
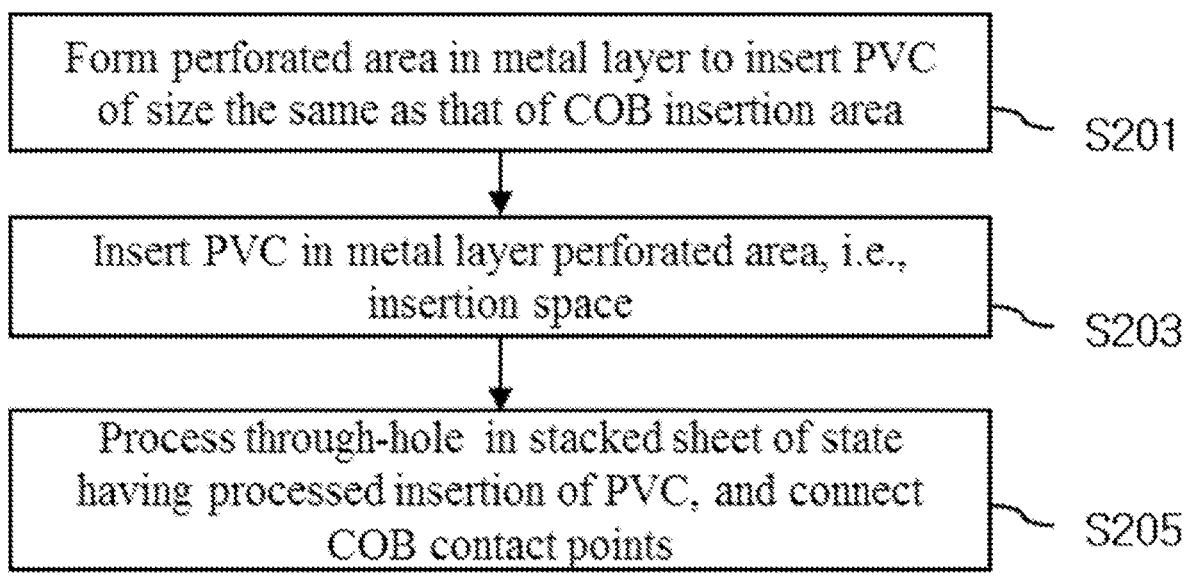
FIG. 14 is a flowchart illustrating a method of manufacturing a metal card according to another embodiment of the present invention.

FIG. 14 is a flowchart illustrating a method of manufacturing a metal card according to another embodiment of the present invention.

Referring to FIG. 14, a processing layer 115 insertion space may be formed in the metal layer 110 by forming a perforated area (S201). The processing layer insertion space is for inserting the processing layer 105 of a PVC material, and may also be referred to as a PVC insertion space.

As an embodiment, the processing layer insertion space may be formed by perforating a metal sheet, and when the insertion space is completed, PVC of the processing layer 115 may be inserted into the insertion space.

Thereafter, as the through-hole processing process and the COB contact point connection process using a conductive elastic liquid described in FIG. 13 are performed on the stacked sheets in which the PVC is inserted (S205), short circuit or electrical interference generated by connection of the through-hole processed in the processing layer 115 to the metal layer 110 can be prevented in advance.

For example, the processing layer 115 may be inserted by perforating the metal layer 110, and perforation for the processing layer insertion space may be performed through a Computerized Numerical Control (CNC) machining process. At this point, a separate adhesive or the like may be used to fix the processing layer 115. Thereafter, as the primary to quaternary milling processes according to the secondary CNC machining may be performed on the entire laminated body, the antenna coil itself is only exposed to the processing layer 115 and the conductive layer 240 and does not directly contact the metal layer 110. According to this machining process, the antenna coil may be implemented not to contact with the metal material during processing.

Although preferred embodiments of the present invention are shown and described above, the present invention is not limited to the specific embodiments described above, and various modified embodiments can be made by those skilled in the art without departing from the gist of the present invention claimed in the claims described below, and these modified embodiments should not be individually understood from the spirit and prospect of the present invention.

| DESCRIPTION OF SYMBOLS | |
| --- | --- |
| 100: Metal card | 110: Metal layer |
| 120, 125: Adhesive layer | 130, 135: Insulating layer |
| 140: First inlay layer | 145: Second inlay layer |
| 150: Hologram layer | 160: First printing layer |
| 165: Second printing layer | 170: Magnetic strip overlay layer |
| 147: Inlay-integrated printing layer | 205: COB pad accommodation unit |
| 220: COB chip accommodation unit | 230: Through-hole |
| 240: Conductive layer | 300: COB |
| 305: COB pad | 310: COB contact points |
| 320: COB chip | |

The invention claimed is:

1. A metal card manufacturing method comprising:
forming a metal card by laminating stacked sheets comprising a plurality of sheets having a metal sheet at a center thereof, wherein the stacked sheets include one or more adhesive sheets having a same size as that of the metal sheet, an upper inlay sheet having a first antenna formed thereon, and a lower inlay sheet having a second antenna formed thereon;
forming a COB (Chip On Board) accommodation space capable of accommodating a COB by milling a predetermined area of the metal card through a computerized numerical control (CNC) machining process;
forming a through-hole exposing the first antenna and the second antenna by milling a COB contact point area of the COB accommodation space as deep as the lower inlay sheet;
electrically connecting the first antenna and the second antenna by dispensing a conductive elastic liquid inside the through-hole; and
bidirectionally connecting the first antenna and the second antenna to the COB by attaching the COB in the COB accommodation space so that contact points of the COB are connected by the conductive elastic liquid,
wherein the forming the COB accommodation space comprises:
performing a primary milling to a first depth to expose an upper inlay sheet area corresponding to a COB pad area for inserting the COB; and
performing secondary milling on an area corresponding to a COB chip area to a second depth to form a COB chip accommodation unit in the COB pad area,
wherein the forming a through-hole comprises:
cutting to a third depth by performing an adjusted tertiary milling of the COB accommodation space until at least a part of the first antenna corresponding to the COB contact point area is exposed for connection of the contact points of the COB; and
processing to form the through-hole by performing a quaternary milling on a tertiary-milled area until at least a part of the second antenna of the lower inlay sheet is exposed, and
wherein the at least a part of the first antenna of the upper inlay layer and the at least a part of the second antenna of the lower inlay layer are both exposed through the formed through-hole.

2. The method according to claim 1, wherein a processing layer insertion space of a PVC material is formed in the metal sheet through perforation, and the metal card is laminated while the processing layer is inserted.

3. The method according to claim 2, wherein electrical interference with the metal sheet is prevented in advance as the through-hole passes through the processing layer and connects the COB contact points.

4. The method according to claim 1, wherein the conductive elastic liquid is dispensed inside and on a top of the through-hole for adhesive fixing and electrical conduction when the contact points of the COB are inserted, and dispensed until a dome shape of a predetermined height is maintained on the through-hole for easy connection with the COB contact points.

5. The method according to claim 1, wherein the conductive elastic liquid is applied through the through-hole to electrically connect the first antenna and the second antenna, fix the COB to be mounted, and form an electrical connection passage of the COB, and includes a conductive curing agent mixed with metal powder or at least one among silicone, urethane, fluoro elastomer, styrene butadiene, neoprene, acrylonitrile copolymer, and acrylate rubber, which contain conductive filler.

6. The method according to claim 1, wherein the metal sheet is made of an SUS material heat-treated to improve strength and tension.

7. A metal card formed by stacking and laminating a plurality of layers including a metal layer of an SUS material heat-treated to improve strength and tension disposed at a center thereof, one or more adhesive layers having a same size as that of the metal layer, an upper inlay layer having a first antenna formed thereon, and a lower inlay layer having a second antenna formed thereon,
wherein the metal card is manufactured by forming a COB (Chip On Board) accommodation space capable of accommodating a COB by milling a predetermined area of the metal card through a computerized numerical control (CNC) machining process, forming a through-hole exposing the first antenna and the second antenna through a process of milling a COB contact point area of the COB accommodation space as deep as the lower inlay layer, electrically connecting the first antenna and the second antenna by dispensing a conductive elastic liquid inside the through-hole, and bidirectionally connecting the first antenna and the second antenna to the COB by attaching the COB in the COB accommodation space so that COB contact points are connected by the conductive elastic liquid,
wherein the COB accommodation space is formed by performing a primary milling to a first depth to expose the upper inlay layer corresponding to a COB pad area for inserting the COB, and performing a secondary milling on an area corresponding to a COB chip area to a second depth to form a COB chip accommodation unit, and
wherein the through-hole is formed by cutting to a third depth by performing an adjusted tertiary milling of the COB accommodation space until at least a part of the first antenna corresponding to the COB contact point area is exposed for connection of the COB contact points, and performing a quaternary milling on a tertiary-milled area until at least a part of the second antenna of the lower inlay layer is exposed, and
wherein the at least a part of the first antenna of the upper inlay layer and the at least a part of the second antenna of the lower inlay layer are both exposed through the formed through-hole.

8. The metal card according to claim 7, wherein a processing layer insertion space of a PVC material is formed in the metal layer through perforation, and the metal card is laminated while the processing layer is inserted.

9. The metal card according to claim 8, wherein electrical interference with the metal layer is prevented in advance as the through-hole passes through the processing layer and connects the COB contact points.

10. The metal card according to claim 7, wherein the conductive elastic liquid is dispensed inside and on a top of the through-hole for adhesive fixing and electrical conduction when the contact points of the COB are inserted, and dispensed until a dome shape of a predetermined height is maintained on the through-hole for easy connection with the COB contact points.

11. The metal card according to claim 7, wherein the conductive elastic liquid is applied through the through-hole to electrically connect the first antenna and the second antenna, fix the COB to be mounted, and form an electrical connection passage of the COB, and includes a conductive curing agent mixed with metal powder or at least one among silicone, urethane, fluoro elastomer, styrene butadiene, neoprene, acrylonitrile copolymer, and acrylate rubber, which contain conductive filler.

* * * * *